(12) United States Patent
Cattarinussi et al.

(10) Patent No.: US 8,955,939 B2
(45) Date of Patent: Feb. 17, 2015

(54) INK JET PRINTING METHOD

(75) Inventors: Serge Cattarinussi, Yverdin-Les-Bains (CH); Ana Dimitrijevic, Yverdon-Les-Bains (CH); Yves-Julien Regamey, Yverdon-Les-Bains (CH)

(73) Assignee: SICPA Holding SA, Prilly (CH)

( * ) Notice: Subject to any disclaimer, the term of this patent is extended or adjusted under 35 U.S.C. 154(b) by 0 days.

(21) Appl. No.: 13/977,348

(22) PCT Filed: Dec. 30, 2010

(86) PCT No.: PCT/IT2010/000519
§ 371 (c)(1),
(2), (4) Date: Nov. 1, 2013

(87) PCT Pub. No.: WO2012/090231
PCT Pub. Date: Jul. 5, 2012

(65) Prior Publication Data
US 2014/0049576 A1    Feb. 20, 2014

(51) Int. Cl.
*B41J 2/07* (2006.01)
*H04N 1/60* (2006.01)
*B41J 2/21* (2006.01)

(52) U.S. Cl.
CPC ... *B41J 2/07* (2013.01); *H04N 1/60* (2013.01); *B41J 2/2135* (2013.01)
USPC .............................................. 347/14; 347/19

(58) Field of Classification Search
CPC .......... B41J 2/07; B41J 2/2135; B41J 29/393; B41J 2/04558; H04N 1/4052; H04N 1/32203; G02B 6/0086; G06K 9/346
USPC .................... 347/14, 15, 19, 41, 43
See application file for complete search history.

(56) References Cited

U.S. PATENT DOCUMENTS

| | | | | |
|---|---|---|---|---|
| 6,502,913 B2* | 1/2003 | Ho et al. | | 347/9 |
| 7,438,375 B2* | 10/2008 | Arazaki | | 347/15 |
| 2005/0219278 A1 | 10/2005 | Hudson | | |
| 2005/0231742 A1 | 10/2005 | Hirano | | |

FOREIGN PATENT DOCUMENTS

| | | |
|---|---|---|
| EP | 0863480 | 9/1998 |
| JP | 2000-185396 | 7/2000 |
| JP | 2005-329706 | 12/2005 |

(Continued)

OTHER PUBLICATIONS

International Search Report and Written Opinion issued in PCT/IT2010/000519 dated Dec. 12, 2010.
Japan Office Action conducted in counterpart Japan Appln. No. 2013-546823 (Jul. 29, 2014) (w/ English language translation).

(Continued)

*Primary Examiner* — Thinh Nguyen
(74) *Attorney, Agent, or Firm* — Greenblum & Bernstein, P.L.C.

(57) ABSTRACT

An ink jet printing method includes providing an ensemble of dots to be printed. A current run is made of through the ensemble of dots to be printed, which includes, for each of dot of the ensemble of dots, deleting all neighboring dots from the current run having a distance less than at least one predetermined value and keeping non-deleted dots as remaining dots in the current run. The remaining dots are assigned to a certain layer corresponding to the current run. The remaining dots of the current run are then removed from the ensemble of dots. The foregoing steps are repeated until there are no further dots in the ensemble of dots.

20 Claims, 5 Drawing Sheets

(56) References Cited

FOREIGN PATENT DOCUMENTS

JP 2006-044258 2/2006
WO WO-2009/031165 12/2009

OTHER PUBLICATIONS

Mexico Office Action conducted in counterpart Mexico Appln. No. MX/a/2013/007652 (Sep. 22, 2014) (w/ machine translation).

* cited by examiner

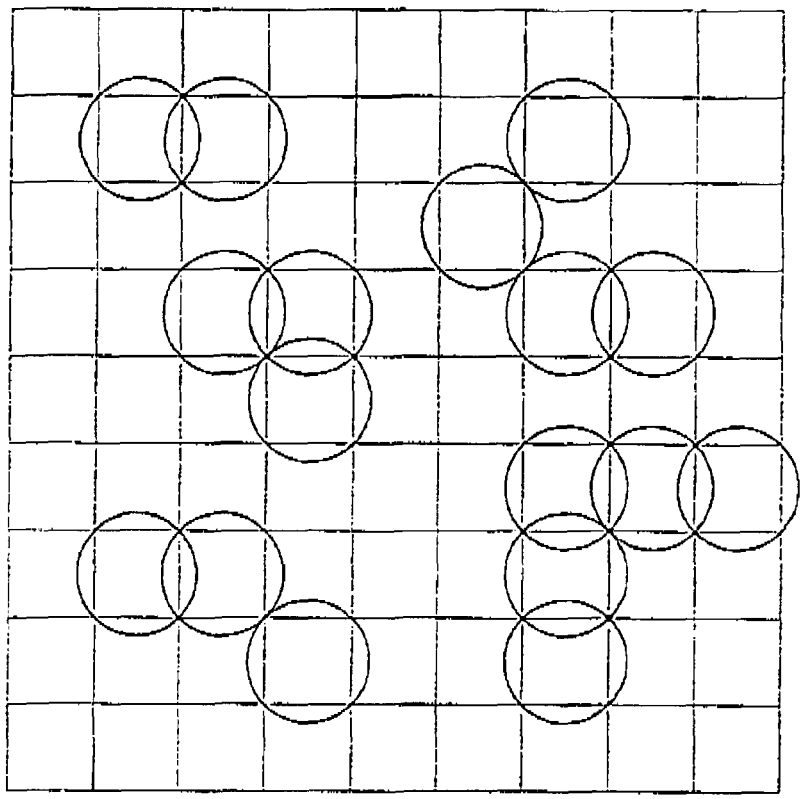
Fig. 1 - Prior Art
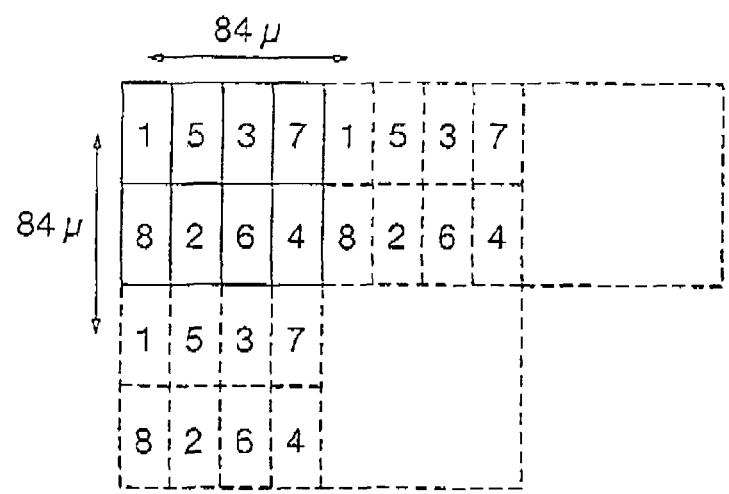
Fig. 2A - Prior Art

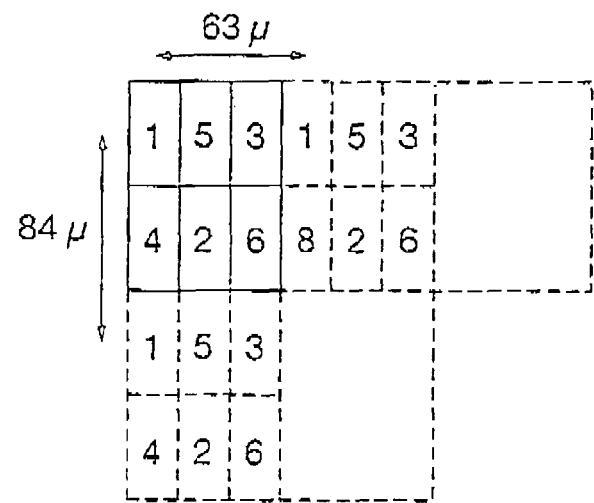
Fig. 2B - Prior Art
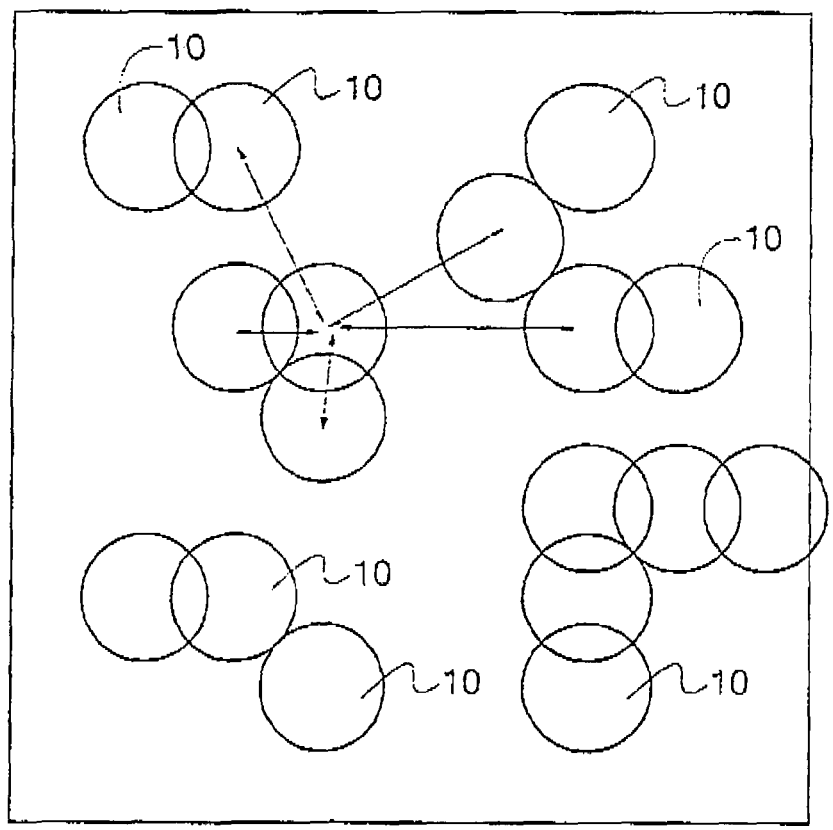
Fig. 3

INK JET PRINTING METHOD

TECHNICAL FIELD

The present invention relates, in general, to an ink jet printing method suitable for printing text or images on a media.

In particular, the present invention relates to an ink jet printing method suitable for printing texts or images on plastic cards, as for instance credit cards, bank cards, etc.

BACKGROUND ART

A complete printing process, starting for instance from an image displayed on a screen (source image), requires that a computer or a micro-processor duly programmed performs a plurality of conversion steps in order to obtain, starting from an additive primary colours image or RGB (Red, Green, Blue) image, a corresponding subtractive primary colours image or CMYK (Cyan, Magenta, Yellow, Key black) image suitable to be printed by using ink dots.

The conversion steps, as for instance disclosed in Patent Publication WO2009/031165 in the name of the Applicant, comprise, for example:
- a calibration process wherein a weight is assigned to each point of the source image and a corresponding set of subtractive colours image is generated;
- a halftoning process wherein subtractive colours are arranged in order to obtain on the printed media an optical effect similar to that visible on the screen;
- a printing process wherein, according to the result of the halftoning process and a certain printing strategy, CMY and, optionally, K dots are ejected by a print head on a printable media.

The printing process and in particular the printing strategy (shingling strategy), in general, requires that the computer duly programmed avoids coalescence, in particular in cases where plastic cards need to be printed by using ink jet printing, because drying time of dots is very long.

As known, when ink dot are ejected on a media, a problem of coalescence may exist if not dried dots (dots) superimpose on each other.

Coalescence problem, in general, may be due to two different superimposing situations or problems:
- adjacent dots superimpose during print head dots ejection; in other words the problem can happen if the print head ejects superimposing dots during a carriage pass (a carriage pass is defined as a single travel of the print head from one edge of the media to the other);
- dots ejected in a pass following a previous pass superimpose previous dots before drying thereof.

According to known prior art the first coalescence problem is solved through a shingling strategy based on a raster grid, where each pixel (and therefore the dot deposited on that pixel) is assigned to various layers so as to avoid coalescence; according to present disclosure the term layer is assumed to represent an image that is printed with several non overlapping print swaths or passes. For instance, FIG. 1 shows a two layer shingling strategy or procedure where the dots on a grey square or pixel are printed in a first layer and those on a white square are printed in a second layer so that coalescence is avoided.

In practical cases the above strategy requires, for instance, that:
- assuming that dots of each layer must have a certain minimum distance, for instance $D_{min}$=84 µm;
- assuming that printer is using an asymmetric printing resolution of $600_{vert} \times 1200_{horiz}$ dots per inch (dpi) whereby a rectangular pixel is defined having dimensions of $42_{vert} \times 21_{horiz}$ µm as shown in FIG. 2a;
- an eight layer shingling strategy will be optimal to obtain full coverage because all dots will be printed at exactly 84 µm from each other.

In other words the eight layer shingling strategy is optimal for obtaining a full coverage but may not be optimal in cases where:
- full coverage is not a necessity in order to reach colour saturation; or
- print time is an issue and the number of layers needs to be reduced by using a coverage lower than full coverage.

For instance, assuming that 6/8 of the full coverage could be enough, one could expect 6 layers to be sufficient in order to avoid coalescence. But it is apparent that by using the prior art strategy with 6 layers instead of 8, the required distance between dots (FIG. 2b) will not be enforced and the first coalescence problem will appear. To be more precise, we consider FIGS. 2a and 2b which both exemplify prior art shingling strategy when printing at a resolution of $600_{vert} \times 1200_{horiz}$ dots per inch, using 8 and 6 shingling passes, respectively. In both cases, the pixel raster grid is represented and pixels are numbered according to the pass to which they belong to. Meaning that dots falling on pixels numbered with are printed on the first shingling pass, pixels numbered with 2 are printed on the second pass, and so on. Considering that, at a resolution of $600_{vert} \times 1200_{horiz}$ dots per inch, the pixel size is $42_{vert} \times 21_{horiz}$ µm, and considering also that 6/8 of all pixels will be occupied by a dot in a pseudo random way, it becomes evident that:
- on FIG. 2a, the prior art 8 passes shingling strategy always enforce the required coalescence distance of 84 µm.
- on FIG. 2b, the prior art 6 passes shingling strategy only does enforce a distance of 63 µm which does not prevent coalescence.

In summary, Applicant has noted, in general, that known prior art does not optimally solve the first coalescence problem. "Optimally" means that, in order to avoid the first coalescence problem, the classic shingling strategy needs a number of layers larger than due.

Applicant has noted, moreover, that the first coalescence problem is an issue in cases where plastic cards need to be printed.

DISCLOSURE OF THE INVENTION

The object of the present invention is thus to provide a solution to the first coalescence problem as outlined above.

According to the present invention, such an object is achieved by means of an ink printing method having the features set forth in the claims that follow.

The present invention also relates to a computer program product loadable in the memory of at least one computer unit and including software code portions for performing the steps of the method of the invention when the product is run on at least one computer unit.

Claims are an integral part of the teaching of the present invention.

According to a feature of a preferred embodiment of the present invention the ink jet printing method provides a shingling strategy wherein, starting from an ensemble of dots of an image, printing layers are built by inserting in each printing layer dots by checking the distance between each dot of the ensemble of dots and its neighbouring dots.

According to a further feature of the present invention enhancements to the general shingling process are provided for taking into account distances between dots made of more than one drop.

According to another feature of the present invention enhancements to the general shingling process are provided for including black dots into the ensemble of the dots and for forcing printing of the black dots by using C, M, Y drops on the same position.

Again according to a further feature of the present invention enhancements to the general shingling process are provided for reducing the number of layers generated by the general shingling process.

BRIEF DESCRIPTION OF DRAWINGS

These and further features and advantages of the present invention will appear more clearly from the following detailed description of preferred embodiments, provided by way of non-limiting examples with reference to the attached drawings, in which components designated by same or similar reference numerals indicate components having same or similar functionality and construction and wherein:

FIG. 1 is a representation of a prior art or classical 2 layers shingling based on raster grid strategy;

FIG. 2a and FIG. 2b are a representation of eight and six layers classical shingling strategy;

FIG. 3 shows a distance evaluation map where distance between each dot and its neighbours is checked;

BEST MODE FOR CARRYING OUT THE INVENTION

Figure 4A:
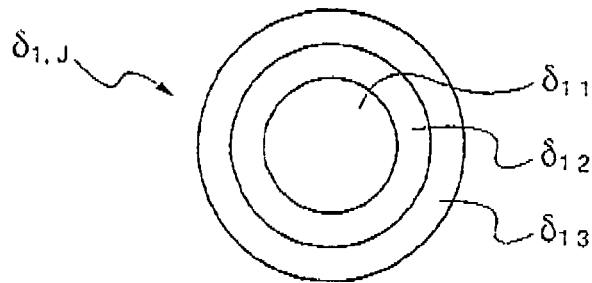
FIGS. 4a, 4b and 4c show examples of deletion masks provided according to the present invention.

With reference to FIG. 3 an approach is shown wherein the distance between each dot (10) and its neighbouring dots (10) is checked in order to decide on which shingling layer they should be printed.

For instance, starting from the practical case or example already described, by using a printing strategy based on dot distances the number of shingling layers required to avoid dot coalescence depends on:

A) The minimum dot distance
B) The number of dots and their spatial distribution;
C) The printing resolution, that according to the exemplary embodiment is $600_{vert} \times 1200_{horiz}$ DPI; however printing resolution is a parameter only required because dots must take discrete positions on the media;
D) The ability to optimally dispatch the dots among a given number of layers by using optimisation processes.

Before proceeding with a disclosure of the shingling process according to the present invention, it is important to emphasize that dispatching the dots among printing layers is a typical optimisation problem to be solved by a minimisation procedure a highly dimensional space.

Any other method must be considered as an approximation. Because the above optimisation requires a huge amount of computing resources, such an optimisation will not be considered in the following.

As a matter of fact, such an approach is considered unpractical.

Instead, an approximated solution is considered practical.

The present invention discloses a shingling process that uses a kind of digital sieve which is briefly summarised here and comprises, in general, the steps that follows.

As easily comprehensible such steps of the shingling process are implemented in a computer or a micro-processor, in general installed in a printer, and comprise, in a basic embodiment:

Step-1: Run through the ensemble of all the dots to be printed;
Step-2: For each dot of the ensemble of all the dots, delete all the neighbouring dots whose distance is less than $D_{min}$ (the minimum distance which does not produce coalescence) and place them in a new ensemble of dots. The removed dots are not visited anymore in the current run;
Step-3 At the end of the current run, assign the remaining dots to a layer (current layer) corresponding to the current run;
Step-4 Remove the dots of the current layer from the ensemble of all the dots and start again at step-1, for a further run;
Step-5 Do as many runs as needed to have all dots assigned to printing layers corresponding to the runs done;

The above general process discloses a first embodiment of the present invention.

In order to enhance the general shingling process, some improvements have been introduced.

The improvements, alone or in combination are apt to enhance efficiency of the general shingling process of present invention by:
1—taking into account the fact that a pixel can be occupied by up to three drops, thus progressively enlarging the size of the dots and their minimum coalescence distance;
2—making the shingling process more efficient by grouping dots on the pixels;
3—equilibrating the population of the printing layers so as to limit the printing layers, if required.

1—First Enhancement

As known, when more than one drop is deposited on a same pixel position (usually two or three drops of different colours), usual when printing on plastic cards, the resulting dot located on the pixel position has a larger diameter than the dot produced by a single drop.
As a consequence, the minimum distance which does not produce coalescence must be increased accordingly.
The minimum dot distance $D_{min}$ must then be replaced by a symmetric distance matrix $$D_{min} = \begin{matrix} \delta_{11} & \delta_{12} & \delta_{13} \\ \delta_{21} & \delta_{22} & \delta_{23} \\ \delta_{31} & \delta_{32} & \delta_{33} \end{matrix}$$

using
i as a row index;
and
j as a column index;
the matrix is symmetrical, i.e. $\delta_{ij} = \delta_{ji}$; and
$\delta_{ij}$ is the required distance between a dot formed with i drops and a dot formed with j drops.

A simple change in the form and application of the general process for generating printing layers by using a deletion masks as provided in Step-2 of the basic smart shingling process can account for the size of both interacting dots.

Figure 4B:
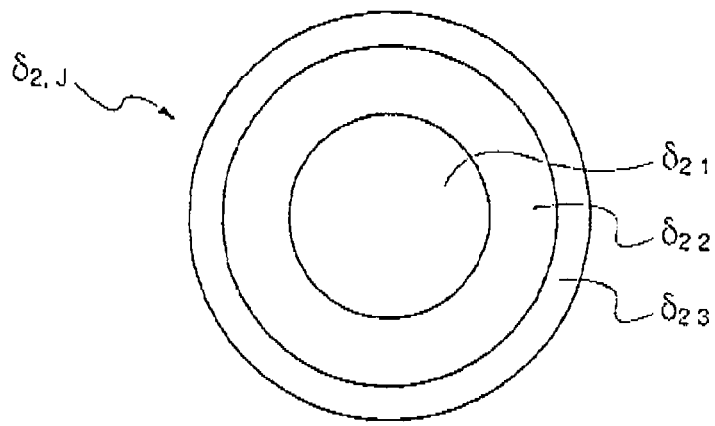
Figure 4C:
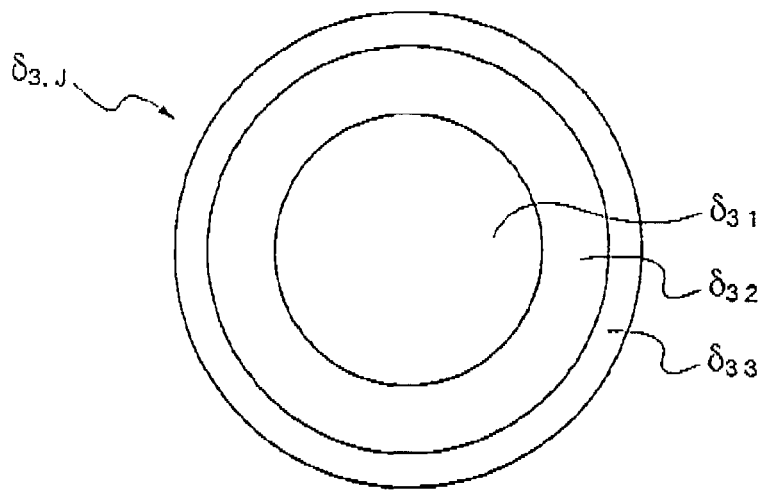

As shown in FIGS. 4a, 4b and 4c the structure of the deletion masks changes as a function of the number of drops required in each dot of an image to be printed.

For instance, to perform a deletion around a dot formed by 2 drops, the deletion mask of FIG. 4b must be centred on said 2 drops dot. Then, said deletion mask deletes all neighbouring dots formed by 3 drops and falling within a distance $\delta_{23}$, all neighbouring dots formed by 2 or 3 drops and falling within a distance $\delta_{22}$, and all neighbouring dots formed by 1, 2 or 3 drops and falling within a distance $\delta_{21}$.

A corresponding process applies, to the deletion mask of FIG. 4a and FIG. 4c, applied around dots formed by 1 and 3 drops, respectively.

In practical cases, Applicant has noted that in order to have both a limited number of distances to take into account and a good approximation, it is enough to estimate the distances by using a simplified distance matrix wherein:

$$D_{min\ (approx)} \begin{matrix} \delta_{11} & \delta_{22} & \delta_{33} \\ \delta_{22} & \delta_{22} & \delta_{33} \\ \delta_{33} & \delta_{33} & \delta_{33} \end{matrix}$$

In summary, the general shingling process may be applied by introducing an approximated deletion mask, without departing from the process in general terms and without introducing visible errors in the printing process as verified by the Applicant.

For instance, by applying the example already used for commenting the prior art, the result is that the approximated distance matrix comprises the following values (in μm) according to empirical measurements made by the Applicant.

$$D_{min\ (approx)} \begin{matrix} 84 & 93 & 105 \\ 93 & 93 & 105 \\ 105 & 105 & 105 \end{matrix}$$

Therefore, assuming, according to the practical example, that the deletion mask needs in Step-2 to be applied to each dot of the ensemble of an image as resulting after an halftoning process, the image comprises:
- a 2D matrix whose elements are $p_{ij}$;
- indices i and j give the dot position in the image; and
- the value of each element of the image can be:

$$p_{ij}=0, p_{ij}=1, p_{ij}=2, \text{ or } p_{ij}=3$$

as a function of the number of drops forming the dot at position (i,j).

Considering that, according to the example, the printer resolution is 600×1200 dpi, the pixel size is 42 μm×21 μm, and the deletion masks are constructed by using the values in the distance matrix $D_{min\ (approx)}$, said deletion masks take the form:

$$Del^1 = \begin{matrix} 4 & 4 & 4 & 4 & 3 & 3 & 3 & 3 & 3 & 4 & 4 & 4 & 4 \\ 4 & 3 & 3 & 3 & 2 & 2 & 2 & 2 & 2 & 3 & 3 & 3 & 4 \\ 3 & 3 & 2 & 1 & 1 & 1 & 1 & 1 & 1 & 1 & 2 & 3 & 3 \\ 3 & 3 & 2 & 1 & 1 & 1 & 4 & 1 & 1 & 1 & 2 & 3 & 3 \\ 3 & 3 & 2 & 1 & 1 & 1 & 1 & 1 & 1 & 1 & 2 & 3 & 3 \\ 4 & 3 & 3 & 3 & 2 & 2 & 2 & 2 & 2 & 3 & 3 & 3 & 4 \\ 4 & 4 & 4 & 4 & 3 & 3 & 3 & 3 & 3 & 4 & 4 & 4 & 4 \end{matrix}$$

which is a practical form of the mask in FIG. 4a $$Del^2 = \begin{matrix} 4 & 4 & 4 & 4 & 3 & 3 & 3 & 3 & 3 & 4 & 4 & 4 & 4 \\ 4 & 3 & 3 & 3 & 1 & 1 & 1 & 1 & 1 & 3 & 3 & 3 & 4 \\ 3 & 3 & 1 & 1 & 1 & 1 & 1 & 1 & 1 & 1 & 1 & 3 & 3 \\ 3 & 3 & 1 & 1 & 1 & 1 & 4 & 1 & 1 & 1 & 1 & 3 & 3 \\ 3 & 3 & 1 & 1 & 1 & 1 & 1 & 1 & 1 & 1 & 1 & 3 & 3 \\ 4 & 3 & 3 & 3 & 1 & 1 & 1 & 1 & 1 & 3 & 3 & 3 & 4 \\ 4 & 4 & 4 & 4 & 3 & 3 & 3 & 3 & 3 & 4 & 4 & 4 & 4 \end{matrix}$$

which is a practical form of the mask in FIG. 4b $$Del^3 = \begin{matrix} 4 & 4 & 4 & 4 & 1 & 1 & 1 & 1 & 1 & 4 & 4 & 4 & 4 \\ 4 & 1 & 1 & 1 & 1 & 1 & 1 & 1 & 1 & 1 & 1 & 1 & 4 \\ 1 & 1 & 1 & 1 & 1 & 1 & 1 & 1 & 1 & 1 & 1 & 1 & 1 \\ 1 & 1 & 1 & 1 & 1 & 1 & 4 & 1 & 1 & 1 & 1 & 1 & 1 \\ 1 & 1 & 1 & 1 & 1 & 1 & 1 & 1 & 1 & 1 & 1 & 1 & 1 \\ 4 & 1 & 1 & 1 & 1 & 1 & 1 & 1 & 1 & 1 & 1 & 1 & 4 \\ 4 & 4 & 4 & 4 & 1 & 1 & 1 & 1 & 1 & 4 & 4 & 4 & 4 \end{matrix}$$

which is a practical form of the mask in FIG. 4c

Wherein the central element of the deletion mask is placed on the dot $p_{ij}$; and
1 means no dots can be accepted in that location;
2 means only a dot made of 1 drop can be accepted in that location;
3 means only a dot made of 1 or 2 drops can be accepted in that location;
4 means only a dot made of 1, 2 or 3 drops can be accepted in that location (i.e. any dot is accepted in a practical case).

I.e., by using a mathematical expression, when $p_{ij}=n$, deletion is provided if:

$$p_{i+k,j-l} \geq Del^n_{k,l}$$

wherein indices k and l span the deletion mask.

For instance, the deletion mask provides that, by centering the mask $Del^2$ on an image dot formed by 2 drops, at position (i,j), the dots that can be inserted in the current layer, in positions wherein the deletion mask $Del^2$ has a value of 3, are dots made of 1 or 2 drops, and the dots that can be inserted in the current layer, in positions wherein the deletion mask $Del^2$ has a value of 4, are dots made of 1, 2 or 3 drops.

The above example application corresponds to the approximated distance matrix $D_{min\ (approx)}$, but it can be readily extended to the more general distance matrix $D_{min}$.

The first enhancement provides the feature of optimizing printing process when halftoning process is arranged to provide dots comprising more than one drop.

2—Second Enhancement

A further enhancement to the shingling process according to the present invention requires, for instance, to reduce the number and the density of dots by providing (favoring) dots having more than one drop on pixels.

A simple solution to this requirement consist in adapting calibration process and/or halftoning process so as to use black ink even if black ink is not physically available in the printer.

According to this enhancement it is provided that the logical set of inks becomes C M Y K and that a recipe which replaces some C M Y triplets by one K drop be given.

According to the preferred embodiment of present invention a known recipe is used, referred to as UCR (Under Color Removal), that operates at the color calibration level and includes the following steps:

(I) Start from the C M Y color specification and find the minimum of the three value: U=min(C, M, Y). This value represent the gray component of the color C M Y. This gray component U could be rendered using black (K) ink.

Figure 5:
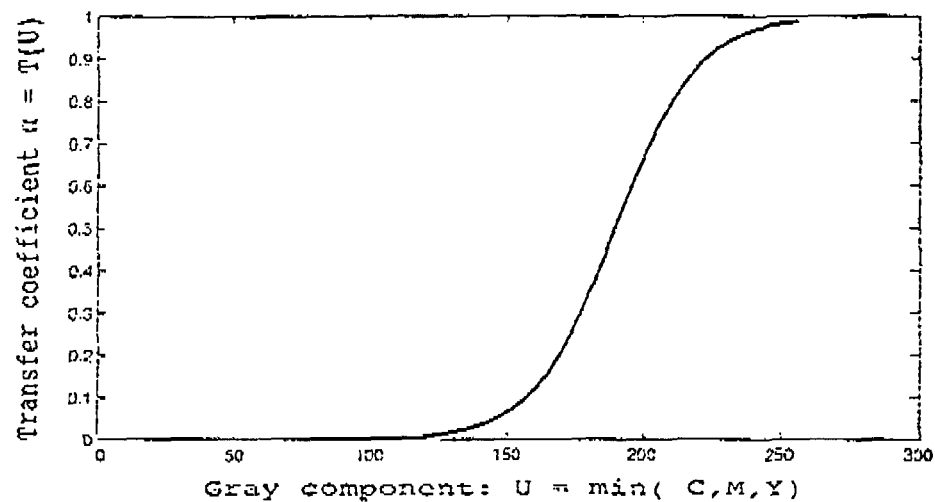
FIG. 5 shows an example of black transfer coefficient applicable for enhancing the shingling process of the present invention.

(II) Define a black transfer coefficient α=T (U) as a function of U as shown, for instance, in FIG. 5. The definition of a black transfer coefficient is useful because rendering the totality of the gray component with black ink produces very grainy prints in the light gray areas and conversely, dark gray areas benefit from the large light absorption of the K inks.

(III) Calculate the new C M Y K components wherein:

$$U=\min(C,M,Y)$$

$$\alpha=T(U)$$

$$K=\alpha \cdot U$$

$$C'=C-K$$

$$M'=M-K$$

$$Y'=Y-K$$

wherein a value α=1 means that the totality of the gray component is rendered using black K ink.

Therefore, according to the second enhancement, even if there is no black K ink available, for instance the UCR procedure can be used to produce K dots which can be printed using three overlapping C,M,Y drops. The net result being that some C, M, and Y dots potentially placed on neighboring pixels are forced to be on the same pixel.

In other words, the data to be sent to the printer, including the halftoning process, is prepared as if there was a K ink component, using, preferably, a suitably tuned UCR procedure and, then, as a last step, every K drop is replaced by three C, M, and Y overlapping drops.

3—Third Enhancement

A third enhancement to the shingling process according to the present invention is directed to optimize the population of the printing layers in order to limit the number of printing layers.

Figure 6A:
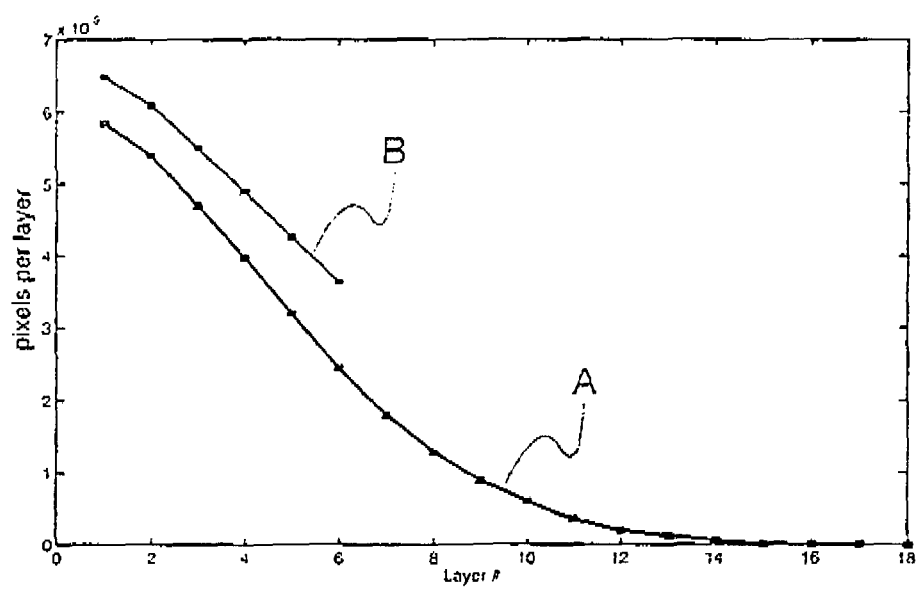
FIGS. 6a and 6b shows an example of a further process for enhancing the shingling process of the present invention.

The shingling process according to present invention, theoretically may occupy pixels in a large number of layers, as shown in FIG. 6a curve A.

Clearly, if a large number of low populated layers is produced a corresponding large number of printing passes need to be provided.

According to one of the possible enhancements of the shingling process according to present invention, a procedure is proposed, herein referred to as refolding, which redistribute the dots assigned to low populated layers on the previous more populated ones.

Figure 6B:
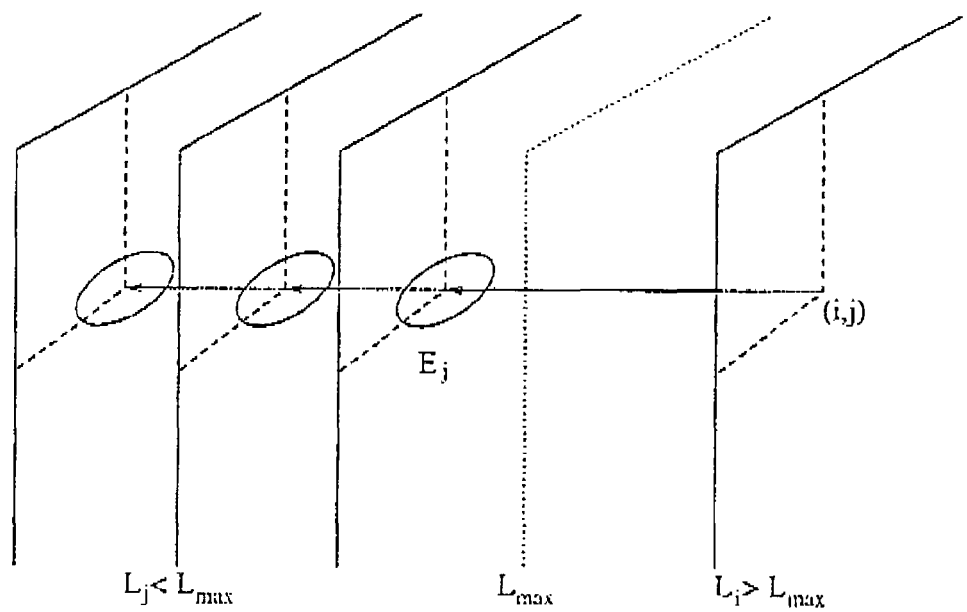

As shown in FIG. 6b the refolding procedure provides the following steps:

Firstly, the maximum number of layers, $L_{max}$, is fixed;
Secondly, all the dots assigned to a layer $L_i > L_{max}$ will be redistributed (refolded) among the layers $L_j \leq L_{max}$.

According to the preferred embodiment, the position (i, j) of the dots is not changed. For each <<refolded>> dot, a specific layer $L_j$ is chosen according to its interaction energy $E_j$ with its neighbors on $L_j$.

Preferably, the energy $E_j$ can be any decreasing monotonous function of the distances between the "refolded" dot (i, j) and its neighbors on layer $L_j$.

By applying the refolding procedure, as disclosed, it is possible to obtain a limited number of layers as shown in FIG. 6a, curve B.

It must be understood that the refolding procedure necessarily produce some violation of the minimum dot distances and, therefore, may provide some coalescence conflict.

However, Applicant has demonstrated that the shingling process according to the present invention enhanced with the refolding procedure gives better results than the known shingling process, in particular when a limited number of layers is required.

Figure 7:
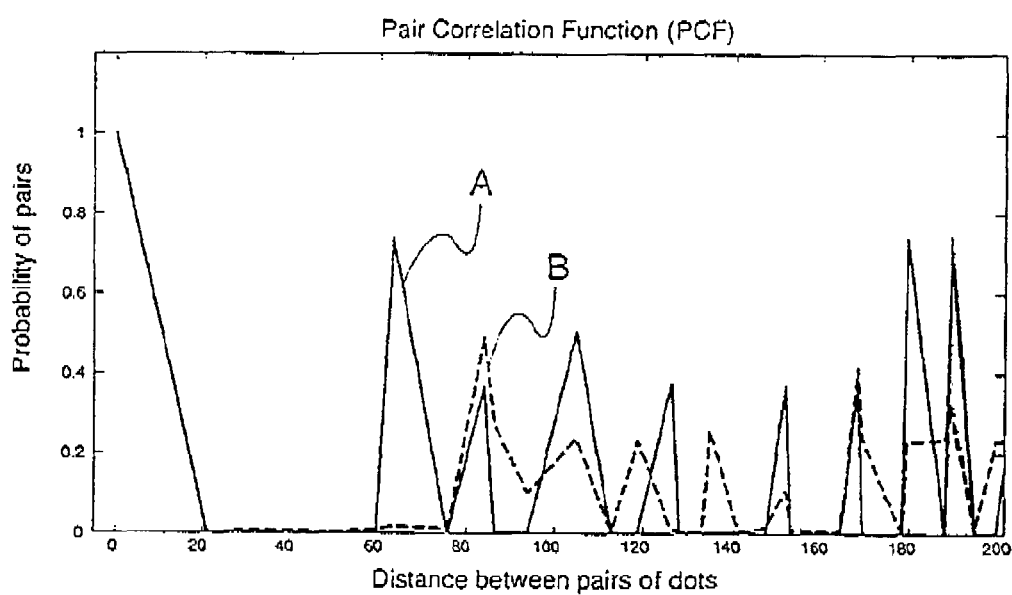
FIG. 7 shows a statistical analysis of the results obtained by applying the shingling process according to the present invention, compared with the classic shingling method.

As a matter of fact Applicant has noted that, by using, for instance, the $\frac{6}{8}^{th}$ of the full coverage as in the prior art example, and by calculating for one layer the so named Pair Correlation Function (PCF), the prior art shingling process (FIG. 7, curve A) produces PCF values:

showing a first peak at distance 0, which corresponds to the case where a dot form a pair with itself (ininfluent);
strictly equal to zero for distances x<63; i.e. a zero probability of having a pair of dots closer than 63 µm;
a first peak for distances x=63, i.e. a high probability of having two dots at a distance less than the coalescence distance $D_{min}$=84 µm.

The shingling process according to present invention produces PCF values (FIG. 7, curve B):

showing a first peak at distance 0, which corresponds to the case where a dot form a pair with itself (ininfluent);
very small values for pair distances x<84, i.e. a very low probability of having two dots at a distance smaller than 84 µm;
a first peak for distances x=84, i.e. a high probability of having two dots at a distance larger or equal than the coalescence distance $D_{min}$=84 µm.

In summary, Applicant believes that the shingling process as disclosed with or without the cited enhancements can be superior in most cases to the known raster shingling process as known.

Of course, obvious changes and/or variations to the above disclosure are possible, as regards dimensions and components, as well as details of the described construction and operation method without departing from the scope of the invention as defined by the claims that follow.

The invention claimed is:

1. An ink jet printing method, comprising:
providing an ensemble of dots to be printed;
performing a current run through the ensemble of the dots to be printed, including:
for each dot of the ensemble of the dots, deleting all neighboring dots from the current run having a distance less than at least one predetermined value (Dmin) and keeping non-deleted dots as remaining dots in the current run;
assigning the remaining dots to a certain layer corresponding to the current run;
removing the remaining dots of the current run from the ensemble of the dots; and
repeating the performing step for a further run until there are no further dots in the ensemble of the dots.

2. The ink jet printing method according to claim 1, wherein the deleting all the neighboring dots comprises: determining for each dot of the ensemble a set of distance values (Dmin), each value being determined as a function of a number of drops to be deposited on the dot of the ensemble and on the neighboring dots.

3. The ink jet printing method according to claim 2, wherein the providing an ensemble of dots comprises:
conducting calibration and halftoning processes arranged to provide black ink dots (K) to be printed by forcing subtractive colors (C, M, Y) drops on a same position.

4. The ink jet printing method according to claim 3, wherein the calibration process comprises utilizing an Under Color Procedure (UCR) that includes using a black transfer coefficient (a) for generating the black ink dots (K).

5. The ink jet printing method according to claim 4, wherein the halftoning process includes replacing every black ink dot by three subtractive colors (C, M, Y) overlapping drops.

6. The ink jet printing method according to claim 3, wherein the halftoning process includes replacing every black ink dot by three subtractive colors (C, M, Y) overlapping drops.

7. The ink jet printing method according to claim 3, defining a predetermined number of layers to be printed; and
redistributing the dots assigned to layers having a number higher than the predetermined number of layers into the layers (Lj) having a number lower or equal to the predetermined number of layers.

8. The ink jet printing method according to claim 2, further comprising:
defining a predetermined number of layers to be printed; and
redistributing the dots assigned to layers having a number higher than the predetermined number of layers into the layers (Lj) having a number lower or equal to the predetermined number of layers.

9. The ink jet printing method according to claim 8, wherein the redistributing the dots comprises:
choosing the layer (Lj), having a number lower or equal to the predetermined number, on the basis of an interaction function or energy function (Ej) of the distances between the redistributed dot with the neighboring dots on the layer (Lj).

10. A computer program product or set of computer program products loadable in a memory of at least one computer and including software code portions arranged to perform, when the product is run on at least one computer, the method according to claim 2.

11. The ink jet printing method according to claim 1, wherein the providing an ensemble of dots comprises:
conducting a calibration and halftoning process arranged to provide black ink dots (K) to be printed by forcing subtractive colors (C, M, Y) drops on a same position.

12. The ink jet printing method according to claim 11, wherein the calibration process comprises utilizing an Under Color Procedure (UCR) that includes using a black transfer coefficient (a) for generating the black ink dots (K).

13. The ink jet printing method according to claim 12, wherein the halftoning process includes replacing every black ink dot by three subtractive colors (C, M, Y) overlapping drops.

14. The ink jet printing method according to claim 11, wherein the halftoning process includes replacing every black ink dot by three subtractive colors (C, M, Y) overlapping drops.

15. The ink jet printing method according to claim 11, defining a predetermined number of layers to be printed; and
redistributing the dots assigned to layers having a number higher than the predetermined number of layers into the layers (Lj) having a number lower or equal to the predetermined number of layers.

16. The ink jet printing method according to claim 15, wherein the redistributing the dots comprises:
choosing the layer (Lj), having a number lower or equal to the predetermined number, on the basis of an interaction function or energy function (Ej) of the distances between the redistributed dot with the neighboring dots on the layer (Lj).

17. The ink jet printing method according to claim 15, wherein the redistributing the dots comprises:
choosing the layer (Lj), having a number lower or equal to the predetermined number, on the basis of an interaction function or energy function (Ej) of the distances between the redistributed dot with the neighboring dots on the layer (Lj).

18. The ink jet printing method according to claim 1, further comprising:
defining a predetermined number of layers to be printed; and
redistributing the dots assigned to layers having a number higher than the predetermined number of layers into the layers (Lj) having a number lower or equal to the predetermined number of layers.

19. The ink jet printing method according to claim 18, wherein the redistributing the dots comprises:
choosing the layer (Lj), having a number lower or equal to the predetermined number, on the basis of an interaction function or energy function (Ej) of the distances between the redistributed dot with the neighboring dots on the layer (Lj).

20. A computer program product or set of computer program products loadable in a memory of at least one computer and including software code portions arranged to perform, when the product is run on at least one computer, the method according to claim 1.

* * * * *

UNITED STATES PATENT AND TRADEMARK OFFICE
CERTIFICATE OF CORRECTION

PATENT NO.        : 8,955,939 B2
APPLICATION NO.   : 13/977348
DATED             : February 17, 2015
INVENTOR(S)       : S. Cattarinussi et al.

It is certified that error appears in the above-identified patent and that said Letters Patent is hereby corrected as shown below:

On the Title page, at Item (73) Assignee, of the printed patent, "SICPA Holding SA" should read -- SICPA HOLDING SA --

Title Page/Abstract, line 2, please change "made of through" to -- made through --

Title Page/Abstract, line 3, please change "for each of dot" to -- for each dot --

Signed and Sealed this
Sixteenth Day of June, 2015

Michelle K. Lee
*Director of the United States Patent and Trademark Office*